United States Patent [19]

Hoffman

[11] 3,896,150

[45] July 22, 1975

[54] 2,6,10-TRIMETHYLDODECA-2,6,11-TRIEN-10-OL-1-AL-2,6-DIMETHYL-2,6-UNDECADIEN-10-ON-1-AL AND THEIR ACETALS AND PROCESSES FOR THEIR PRODUCTION

[75] Inventor: Werner Hoffman, Ludwigshafen, Germany

[73] Assignee: Badische Anilin- & Soda-Fabrik Aktiengesellschaft, Ludwigshafen (Rhine), Germany

[22] Filed: Aug. 23, 1972

[21] Appl. No.: 283,171

[30] Foreign Application Priority Data
Sept. 2, 1971  Germany............................ 2143991
Sept. 2, 1971  Germany............................ 2143992

[52] U.S. Cl. ............. 260/340.7; 252/522; 260/338; 260/340.5; 260/340.9; 260/483; 260/593 R; 260/594; 260/602; 260/615 A
[51] Int. Cl............................................. C07d 15/04
[58] Field of Search.......... 260/340.7, 340.5, 340.9, 260/338

[56] References Cited
UNITED STATES PATENTS
3,381,039  4/1968  Marbet ........................... 260/340.9
3,749,744  7/1973  Siddall ........................... 260/340.9

*Primary Examiner*—Donald G. Daus
*Assistant Examiner*—James H. Turnipseed
*Attorney, Agent, or Firm*—Johnston, Keil, Thompson & Shurtleff

[57] ABSTRACT

2,6,10-trimethyldodeca-2,6,11-trien-10-ol-1-al (I) and its acetals and a process for the production of these important precursors of sinensal via the new acetals of 2,6-dimethyl-2,6-undecadien-10-on-1-al (V). (I) is obtained from acetals of 2-methyl-6-oxo-hept-2-en-1-al by vinylation or ethynylation followed by partial hydrogenation; reaction of the new allyl alcohols obtained with diketene or an acetoacetic ester to form the new acetals (V); vinylation or ethynylation followed by partial hydrogenation of the new acetals (V) and acid hydrolysis.

4 Claims, No Drawings

2,6,10-TRIMETHYLDODECA-2,6,11-TRIEN-10-OL-1-AL-2,6-DIMETHYL-2,6-UNDECADIEN-10-ON-1-AL AND THEIR ACETALS AND PROCESSES FOR THEIR PRODUCTION

The invention relates to 2,6,10-trimethyldodeca-2,6,11-trien-10-ol-1-al and its acetals and a process for the production of these compounds. The compounds in question have the formula (I):

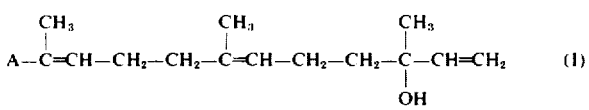

in which A is the group

or

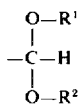

in which R¹ and R² each denotes an aliphatic hydrocarbon radical of one to eight carbon atoms or R¹ and R² together are alkylene of two to eight carbon atoms, cycloalkylene of five or six carbon atoms in the ring, or o-phenylene.

The new compounds may be used as perfume and flavor chemicals having mandarin and orange odor effects. They have very special significance because from the acetals of formula (I) the natural orange flavors α-sinensal and β-sinensal for which there is great demand can be prepared by dehydration and acid hydrolysis in a simple manner and in good yields.

The invention also relates to some new compounds obtained as intermediates in the production of the compounds of formula (I) and which are of interest in the perfume industry due to their fruity notes.

These compounds have the formula (V):

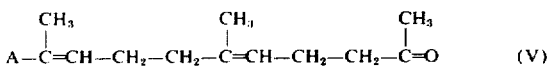

in which A is the group

or

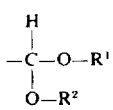

in which R¹ and R² each is an aliphatic hydrocarbon radical of one to eight carbon atoms or R¹ and R² together are alkylene of two to eight carbon atoms, cyclo-alkylene of five or six carbon atoms in the ring, or o-phenylene, and compounds of formula (III):

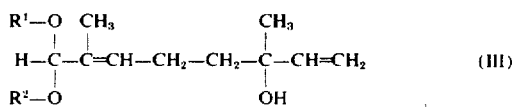

in which R¹ and R² have the meanings given above.

These new compounds can be prepared by a simple method by (a) converting an acetal of formula (II):

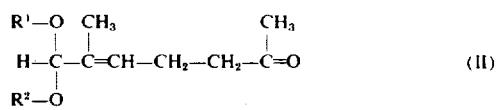

in which R¹ and R² have the meanings given above, either by a Grignard reaction with a vinyl magnesium halide solution or by ethynylation followed by partial hydrogenation into an allyl alcohol of formula (III):

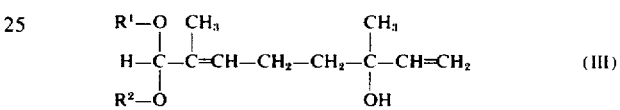

in which R¹ and R² have the meanings given above, then b. converting the allyl alcohol of formula (III) either with diketene at a temperature of from 20° to 100°C in the presence of a basic catalyst into an acetoacetal of formula (IV):

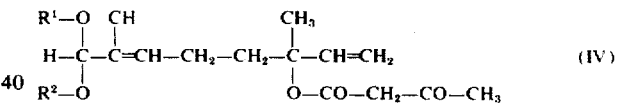

in which R¹ and R² have the meanings given above and pyrolizing this at a temperature of from 150° to 300°C or by direct reaction with an acetoacetic acid ester of an alcohol of one to four carbon atoms at a temperature of from 150° to 300°C;

c. converting the resulting new acetal of formula (V):

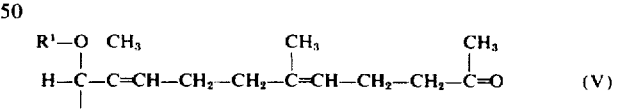

in which R¹ and R² have the meanings given above, either by Grignard reaction with a vinyl magnesium halide solution or by ethynylation followed by partial hydrogenation into a compound of formula (I) in which A is the group:

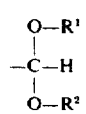

and d. hydrolyzing the resultant acetals of formula (I) in the presence of an acid catalyst to produce a compound of formula (I) in which A is

The synthesis proceeds smoothly and with good yields.

Simple and cyclic acetals of 2-methyl-6-oxohept-2-en-1-al are suitable as acetals of formula (II):

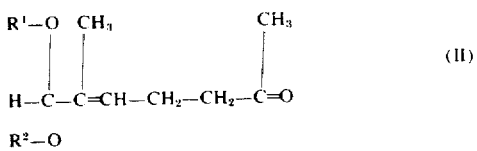

Simple acetals are those in which $R^1$ and $R^2$ is each a (preferably the same) hydrocarbon radical such as methyl, ethyl, propyl, isopropyl, n-butyl, isopropyl, n-butyl, isobutyl, n-pentyl, n-hexyl or 2-ethylhexyl-(1). Methyl and ethyl are particularly suitable as aliphatic hydrocarbon radicals. Examples of suitable cyclic acetals are those derived from the following diols: ethylene glycol, 1,2-propanediol, 1,3-propanediol, 2,2-dimethyl-propanediol-(1,3) 2,3-butanediol, 1,5-pentanediol, 1,4-butanediol, 1,3-butanediol, 1,2-butanediol, 1,6-hexanediol, 1,2-cyclohexanediol and also pyrocatechol as an aromatic diol. It is preferred to use cyclic acetals derived from ethylene glycol, 1,2-propanediol, 1,3-propanediol and also 1,3-butanediol and 2,2-dimethyl-propanediol-(1,3).

Acetals of formula (II) can easily be prepared by reaction of acetals of a 2-methyl-4-halo-2-buten-1-al with an alkali metal compound of an acetoacetic ester with alkaline elimination of the COOR group from the resultant intermediate.

Vinyl magnesium chloride, bromide and iodide and particularly vinyl magnesium chloride are suitable as vinyl magnesium halides.

The production of the vinyl magnesium halide solutions is carried out in a conventional manner by reaction of vinyl chloride, bromide or iodide with magnesium in an ethereal solvent such as diethyl ether, tetrahydrofuran or diethylene glycol dimethyl ether. From 0.5 to 5 molar, preferably about 1 to 2 molar, solutions are used.

Reaction of the vinyl magnesium halide solution with the acetal of formula (II) has to be carried out at the lowest possible temperature because otherwise there is a risk that the acetal group will be attacked. Temperatures of −50° to +30°C, particularly of −20° to +10°C, are therefore used. It is advisable to use an about 10 percent molar excess of the vinyl Grignard compound in order to achieve the highest possible conversion of the ketone.

In the hydrolysis of the magnesium alcoholate formed it is advisable only to use the amount of water required for salt formation, i.e. about 100 ml of water per mole of magnesium.

The allyl alcohol of formula (III) formed may be isolated in the usual way by filtration and fractional distillation of the organic phase formed.

The acetals of formula (II) may also be converted into allyl alcohols of formula (III) by ethynylation followed by partial hydrogenation of the resulting acetylene alcohols.

Ethynylation is carried out either by reaction of the acetal with a solution of ethynyl magnesium halide under the conditions described for the reaction with vinyl magnesium halide or by reaction of the acetal with acetylene in an inert organic solvent in the presence of a heavy metal acetylide such as copper acetylide or silver acetylide or in the presence of a basic-reacting catalyst such as sodium or potassium acetylide, or an oxide, hydroxide, alcoholate or amide of alkali or alkaline earth metal or in the presence of an anion exchanger containing quaternary ammonium groups (cf. Belgian Pat. No. 725,275).

It is particularly advantageous to carry out the reaction with acetylene in the presence of an acetylide of sodium, potassium, lithium or magnesium or of a substance capable of forming such an acetylide under the reaction conditions such as an oxide, hydroxide, alcoholate or amide of one of these metals, and in a solvent such as diethyl ether, tetrahydrofuran, N-methylpyrrolidone or dimethylformamide. The ethynylation is carried out at a temperature of from −20° to +50°C, preferably at 0° to +30°C, and a pressure of from atmospheric pressure to about 30 atmospheres. The reaction product is worked up by hydrolysis and fractional distillation of the organic phase for example as described above.

Partial hydrogenation of the acetylene alcohols obtained into the allyl alcohols of formula (III) may be carried out in the absence or presence of a solvent. It is particularly advantageous to use a solvent. Solvents such as alcohols, for example methanol and ethanol, ethers, for example tetrahydrofuran, dioxane and diethyl ether, and esters such as ethyl acetate are particularly suitable.

Palladium-on-carrier catalysts which contain from 0.01 to 5 percent by weight of palladium are particularly suitable as catalysts. Calcium carbonate, aluminum oxide and silicon oxide are particularly suitable as carriers. To increase selectivity it is advisable to deactivate the said catalysts for example according to German Pat. No. 1,115,238 by treatment with zinc ions or lead ions. Hydrogenation is generally carried out at atmospheric pressure or at a hydrogen pressure of 0.1 to 1 atmosphere gauge and at a temperature of from 0° to 80°C, preferably from 15° to 35°C.

The allyl alcohols of formula (III), i.e. the acetals of 2,6-dimethyl-6-hydroxy-octa-2,7-dien-1-al, obtained from the reaction mixture by filtration and distillation are new compounds. Only 2,6-dimethyl-6-hydroxy-octa-2,7-dien-1-al itself is known. It is prepared according to German Laid-Open Specification No. 1,688,262 in a moderate yield by selenium dioxide oxidation of linalyl acetate followed by hydrolysis of the ester group.

For the production of compounds of the formula (V) in which $R^1$ and $R^2$ have the meanings given above, the allyl alcohols of formula (III) are either reacted for example analogously to J. Chem. Soc., 1940, page 704 direct with an acetoacetic ester, or with diketene into the acetoacetate of formula (IV) which is then pyrolyzed.

The process is preferably carried out with diketene. For this purpose the allyl alcohol of formula (III) first has a basic catalyst added to it and then diketene is added, conveniently in about a molar amount, at a temperature of from 20° to 100°C, preferably from 30° to 60°C.

Strong bases such as the hydroxides and alcoholates of the alkali metals and also ammonia and its substitution products such as primary, secondary and tertiary amines and pyridine are suitable as basic catalysts.

The basic catalyst is used in an amount of from 0.1 to 5 percent, preferably from 0.5 to 1.5 percent, by weight based on the allyl alcohol of formula (III) used.

Pyrolysis of the acetacetates of formula (IV) obtained is carried out at a temperature of from 150° to 300°C, preferably at 180° to 220°C. It may be carried out with particular advantage in the presence of an inert solvent.

Examples of suitable solvents are hydrocarbons which boil at from 150° to 300°C, ethers such as diethylene glycol dimethyl ether and amides such as N-methylpyrrolidone and dimethylformamide.

The solvent is generally used in an amount which is once to five times that of the acetoacetate.

The progress of the reaction may be followed by measuring the amount of carbon dioxide eliminated.

In direct reaction of an allyl alcohol of formula (III) with an acetoacetic ester it is advantageous to use acetoacetic esters of alcohols of one to four carbon atoms in an amount of from 1 to 10 moles, preferably 1 to 3 moles, per mole of allyl alcohol. In this reaction also it is advisable to use an inert solvent.

Suitable solvents are usually the same as specified above for the pyrolysis reaction.

The alcohol formed during the reaction has to be distilled off continuously through a column. The progress of the reaction may be followed here by measuring the carbon dioxide liberated.

To avoid fission of the acetal it is advisable to carry out both the pyrolysis of the acetoacetate and the abovementioned reaction with an acetoacetic ester in the presence of a basic compound as acid interceptor. Alkali metal alcoholates of lower aliphatic alcohols, particularly sodium methylate and potassium ethylate are advantageously used for this purpose in an amount of up to 0.1 mole per mole of acetal.

Acetals of formula (V) are isolated in the usual way, for example by fractional distillation, in both variants of the process.

2,6-dimethyl-2,6-undecadien-10-on-1-al itself can easily be prepared from the acetals of formula (V) by acid hydrolysis.

Hydrolysis may be carried out under the conditions described for hydrolysis of the acetals of formula (I).

2,6-dimethyl-2,6-undecadien-10-on-1-al and its acetals are new compounds. They may be used as perfumes having a pleasant fruity note.

The new acetals of formula (V):

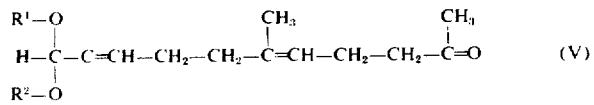

in which R¹ and R² have the meanings given above are either reacted with a solution of a vinyl magnesium halide and the resulting magnesium alcoholates decomposed with water; or they are reacted with a solution of an ethynyl magnesium halide, the resulting magnesium alcoholate is decomposed with water and the acetylene alcohol obtained is partially hydrogenated; or they are reacted with acetylene in the presence of a basic condensing agent and the resulting acetylene alcohol is partially hydrogenated.

The same conditions as have been described for the corresponding reaction of the acetals of formula (II) may be used for the reaction of acetals of formula (V) with a solution of a vinyl or ethynyl magnesium halide. Decomposition of the magnesium alcoholates with water and the partial hydrogenation of the resulting acetylene alcohols may also be carried out as described in detail above.

The acetals of 2,6,10-trimethyldodeca-2,6,11-trien-10-ol-1-al obtained are isolated from the reaction mixture by filtration and distillation.

2,6,10-trimethyldodeca-2,6,11-trien-10-ol-1-al can easily be prepared by acid hydrolysis from the acetals of formula (I).

The acid hydrolysis is carried out by a known method. For example the acetals advantageously have added thereto 0.01 to 1 mole of a mineral acid or an organic acid such as sulfuric acid, hydrochloric acid, formic acid, p-toluenesulfonic acid or acetic acid per mole of acetal in the form of a 1 to 20 percent solution and heated at a temperature of from 10° to 50°C for 0.5 to 5, preferably 2 to 3, hours while mixing intensely.

The addition of a solubilizer to the reaction mixture is recommended in the said hydrolysis. Lower aliphatic alcohols such as methanol, ethanol and propanol and cycloaliphatic ethers such as tetrahydrofuran and dioxane are particularly suitable as solubilizers.

The 2,6,10-trimethyldodeca-2,6,11-trien-10-ol-1-al obtained may be isolated in the usual way for example by extraction after mild neutralization of the reaction mixture, for example with an alkali metal bicarbonate or sodium carbonate, and distilling off the extractant.

By means of the process described a number of interesting new compounds which can be used as perfume and flavor chemicals having mandarin and orange odor effects are accessible for the first time. They have very great significance because the natural flavors α-sinensal and β-sinensal can be prepared in good yields from the acetals of formula (I) in a simple way by dehydration and acid hydrolysis. The said process is therefore an important stage in the synthetic production of α-sinensal and β-sinensal which hitherto has only been possible with moderate yields and by a roundabout method.

The following Examples will illustrate the subject matter of the invention in greater detail.

EXAMPLE 1

Production of 2,6-dimethyl-2,7-octadien-6-ol-1-al butylene-(1,3)-acetal:

a. By reaction with vinyl magnesium chloride:

424 g (2 moles) of 2-methyl-2-hepten-6-on-1-al butylene-(1,3)-acetal is dissolved in 400 ml of tetrahydrofuran and at −10° to −15°C 1692 ml of a 1.3 molar solution of vinyl magnesium chloride (2.2 moles) in tetrahydrofuran is added and the reaction mixture is left for another two hours at the said temperature. 220 ml of water is then dripped in at a temperature lower than 20°C and the precipitated salt is filtered off. The tetrahydrofuran solution is concentrated at subatmospheric pressure and the residue is distilled. 450 g of 2,6- dimethyl-2,7-octadien-6-ol-1-al butylene-(1,3)-acetal acetal is obtained in a yield of 93%.

Boiling point at 0.03 mm: 114° to 120°C; $n_D^{25}$ = 1.4801.

The following compounds are prepared analogously:

2,6-dimethyl-2,7-octadien-6-ol-1-al dimethyl acetal; boiling point 83° to 85°C at 0.03 mm; $n_D^{25}$ = 1.4620;

2,6-dimethyl-2,7-octadien-6-ol-1-al diethyl acetal; boiling point 90° to 93°C at 0.03 mm; $n_D^{25}$ = 1.4626; and 2,6-dimethyl-2,7-octadien-6-ol-1-al-2',2'-dimethylpropylene-(1',3')-acetal; boiling point 116° to 121°C at 0.03 mm; $n_D^{25}$ = 1.4805.

b. By ethynylation followed by partial hydrogenation:

120 g (2.2 moles) of sodium methylate is suspended in 1 liter of tetrahydrofuran in a 3-liter pressure vessel and then 12 atmospheres of nitrogen and 6 atmospheres of acetylene are forced in at 20°C. The acetylene absorbed by the reaction mixture is made up. After the total pressure has remained constant for about one hour, a start is made in adding 300 ml/hour of a solution composed of 424 g (2 moles) of 2-methyl-2-hepten-6-on-1-al butylene-(1,3)-acetal and 200 ml of tetrahydrofuran. After each hour the total pressure is increased by 1 atmosphere up to a maximum of 24 atmospheres by forcing in acetylene. After all the acetal solution has been added reaction is allowed to continue for another ten hours at the said pressure and temperatures of 20° to 25°C. The pressure is then released and the reaction mixture is hydrolyzed with 200 g of ice. The separated organic phase is neutralized with formic acid and the tetrahydrofuran is distilled off at subatmospheric pressure. The residue remaining is distilled. 440 g of 2,6-dimethyl-2-octen-7-in-6-ol-1-al butylene-(1,3)-acetal (yield 92%) is obtained. Boiling point 122° to 128°C; $n_D^{25}$ = 1.4837.

The following compounds are obtained analogously:

2,6-dimethyl-2-octen-7-in-6-ol-1-al dimethyl acetal; boiling point 105° to 110°C at 0.1 mm; $n_D^{25}$ = 1.4674; and 2,6-dimethyl-2-octen-7-in-6-ol-1-al diethyl acetal; boiling point 94° to 96°C at 0.04 mm; $n_D^{25}$ = 1.4671.

For partial hydrogenation in each case 1.5 moles of the acetylene alcohol prepared under 1(b) is dissolved in 100 ml of methanol, then 10 g of a 0.5% palladium/calcium carbonate catalyst deactivated with zinc acetate according to Example 1 of German Pat. No. 1,115,238 is added and hydrogenation is carried out at a hydrogen pressure of 1.5 atmosphere. After the absorption of hydrogen has ended the catalyst is filtered off, the solvent is removed at subatmospheric pressure and the residue is distilled. The product described under 1(a) is obtained in a yield of about 95%.

EXAMPLE 2 a. Reaction of the compounds obtained in Example 1 with diketene followed by pyrolysis of the acetoacetic ester obtained:

480 g (2 moles) of 2,6-dimethyl-2,7-octadien-6-ol-1-al butylene-(1,3)-acetal has 5 ml of triethylamine added to it and the mixture is heated to 50° to 55°C. 166 g (2 moles) of freshly distilled diketene is then added dropwise to this mixture while cooling slightly. The mixture is then allowed to react for fifteen hours at 20° to 55°C. 0.5 liter of ether is added and this solution is washed twice, each time with 250 ml of water. The ether is distilled off at subatmospheric pressure. 620g of residue remains. Analysis, infrared spectrum and NMR spectrum show that it is 2,6-dimethyl-2,7-octadien-6-ol-1-al butylene-(1,3)-acetal.

For the pyrolysis 324 g (1 mole) of the acetoacetate obtained is dissolved in 800 ml of decahydronaphthalene and the solution heated to 190° to 195°C while stirring. Elimination of carbon dioxide is over after forty-five minutes and the reaction mixture is then worked up by distillation. 202 g of 2,6-dimethyl-2,6-undecadien-10-on-1-al butylene-(1,3)-acetal is obtained (yield 72%).

Boiling point 147° to 152° at 0.06 mm; $n_D^{25}$ = 1.4785. Note: peach-like.

The following acetals are obtained analogously to Example 2(a):

2,6-dimethyl-2,6-undecadien-10-on-1-al dimethyl acetal; boiling point 133° to 138°C at 0.05 mm; $n_D^{25}$ = 1.4590; note: resembling pears;

2,6-dimethyl-2,6-undecadien-10-on-1-al diethyl acetal; boiling point 134° to 139°C at 0.03 mm; $n_D^{25}$ = 1.4573; note: resembling pears;

2,6-dimethyl-2,6-undecadien-10-on-1-al 2',2'-dimethylpropylene-(1',3')-acetal; boiling point 144° to 150°C at 0.05 mm; $n_D^{25}$ = 1.4774; note: resembling peaches.

b. Reaction of compounds obtained in Example 1 with methyl acetoacetate:

232 g (2 moles) of methyl acetoacetate and 3 ml of 30% solution of sodium methylate in methanol are added to 240 g (1 mole) of 2,6-dimethyl-2,7-octadien-6-ol-1-al butylene-(1,3)-acetal and the whole is heated while stirring. Methanol thus eliminated is distilled off through a column. After a reaction period of three hours at 170° to 190°C the elimination of carbon dioxide is finished. The reaction mixture is distilled.

2,6-dimethyl-2,6-undecadien-10-on-1-al butylene-(1,3)-acetal is obtained in a yield of 71 percent

EXAMPLE 3

Hydrolysis 100 g (0.36 mole) of 2,6-dimethyl-2,6-undecadien-10-on-1-al butylene-(1,3)-acetal is dissolved in 50 ml of dioxane and the solution is added at a temperature of 30° to 35°C to 50 ml of 1N sulfuric acid. Then about 200 ml of dioxane is added to dissolve the acetal completely and the reaction mixture is stirred for another hour at the said temperature. The mixture is then neutralized by adding sodium carbonate, filtered and the solvent distilled off at subatmospheric pressure. If the product occurs devoid of salt it may be worked up immediately. If not it is taken up in ether, the solution is washed with water, separated and the organic phase distilled. The residue is fractionated. 69 g of 2,6-dimethyl-2,6-undecadien-10-on-1-al is obtained. Boiling point 111° to 112°C at 0.001 mm; $n_D^{25}$ = 1.4890. Note: fresh, resembling citrus, orange flavor.

EXAMPLE 4 a. Reaction with vinyl magnesium chloride 280 g (1 mole) of 2,6-dimethyl-2,6-undecadien-10-on-1-al butylene-(1,3)-acetal is dissolved in 300 ml of tetrahydrofuran and at −10° to −15°C 850 ml (1.1 moles) of a 1.3 molar solution of vinyl magnesium chloride in tetrahydrofuran is added. Reaction is then allowed to continue for two hours at a temperature of −15° to +10°C and then 110 ml of water is dripped in at below 20°C for hydrolysis. The tetrahydrofuran solution is filtered off from the salt and the solvent distilled off at subatmospheric pressure. The residue is fractionated. 278 g of 2,6,10-trimethyldodeca-2,6,11-trien-10-ol-1-al butylene-(1,3)-acetal is obtained. The yield is 90%. Boiling point 166° to 171°C at 0.05 mm; $n_D^{25}$ = 1.4874; note: resembling oranges; orange flavor.

The following acetals are synthesized analogously:

2,6,10-trimethyl-2,6,11-dodecatrien-10-ol-1-al-dimethyl acetal; boiling point 151° to 157°C at 0.05 mm; $n_D^{25}$ = 1.4708; note; resembling mandarin-orange; mandarin-orange flavor.

2,6,10-trimethyl-2,6,11-dodecatrien-10-ol-1-al-diethyl acetal; boiling point 154° to 158°C at 0.05 mm; $n_D^{25}$ = 1.4694; note: mandarin-orange; mandarin-orange flavor.

2,6,10-trimethyl-2,6,11-dodecatrien-10-ol-1-al-2',2'-dimethylpropylene-(1',3')-acetal; boiling point 167° to 171°C at 0.04 mm; $n_D^{25}$ = 1.4888; note: mandarin-orange; mandarin-orange flavor.

b. Ethynylation 60 g (1.1 moles) of sodium methylate is suspended in 1 liter of tetrahydrofuran in a 3-liter pressure vessel and then 12 atmospheres of nitrogen and 6 atmospheres of acetylene are forced in at 20°C. The acetylene absorbed is replaced by forcing more acetylene in. After the total pressure has remained unchanged for about one hour the addition of a solution consisting of 280 g of 2,6-dimethyl-2,6-undecadien-10-on-1-al butylene-(1,3)-acetal and 300 ml of tetrahydrofuran is begun. About 300 ml per hour of this solution is pumped into the pressure vessel. After each hour the total pressure is raised by forcing in more acetylene by 1 atmosphere to a maximum of 24 atmospheres. When all has been added the reaction mixture is allowed to continue reacting at this pressure and at a temperature of from 20° to 25°C for another ten hours. The pressure on the pressure vessel is then released and the contents hydrolyzed with ice. The separated organic phase is carefully neutralized by adding formic acid and the solvent is distilled off at subatmospheric pressure. 288 g of 2,6,10-trimethyl-2,6-dodecadien-11-yn-10-ol-1-al butylene-(1,3)-acetal (yield 92%) is obtained in the distillation of the residue which remains. Boiling point: 169° to 175°C at 0.06 mm; $n_D^{25}$ = 1.4896; note: resembling oranges; orange flavor.

c. Partial hydrogenation:

For partial hydrogenation 300 g of the acetylene alcohol obtained under 4(b) is dissolved in 100 ml of methanol, then 10 g of 0.5% palladium/calcium carbonate catalyst which has been deactivated by treatment with zinc acetate according to Example 1 of German Pat. No. 1,115,238 is added and hydrogenation is carried out at a hydrogen pressure of 1.5 atmospheres. After the absorption of hydrogen has ended (about 25 liters) the catalyst is filtered off, the solvent is removed at subatmospheric pressure and the residue is distilled. The product described under 4(a) is obtained in a yield of 94 percent.

EXAMPLE 5

Acid hydrolysis 100 g (0.324 mole) of the acetal obtained according to Example 4(a) is dissolved in 100 ml of dioxane and added at 30° to 35°C to 100 ml of 1N sulfuric acid. Then such an amount (about 280 ml) of dioxane is added as will cause complete solution. The reaction mixture is then stirred for one hour at 35°C. Potassium carbonate is then added and stirring is continued until the solution has a neutral or slightly alkaline reaction. The whole is then filtered and the solvent is distilled off at subatmospheric pressure. The residue is taken up in 500 ml of ether, the ether solution is washed twice, each time with 200 ml of water, and the ether removed at subatmospheric pressure for further purification. The residue is distilled. 68 g of 2,6,10-trimethyl-2,6,11-dodecatrien-10-ol-1-al is obtained (yield 88% of theory). Boiling point: 122°C at 0.02 mm; $n_D^{25}$ = 1.4953; fresh odor of oranges and mandarins and also an orange flavor.

I claim:

1. A compound of formula (I):

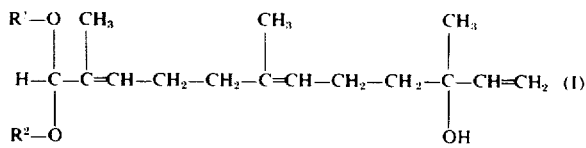

in which $R^1$ and $R^2$ together are alkylene of two to six carbon atoms, cycloalkylene of five or six carbon atoms in the ring, or o-phenylene.

2. A compound as set forth in claim 1 wherein $R^1$ and $R^2$ together are alkylene selected from the group consisting of ethylene, 1,2-propylene, 1,3-propylene, 1,2-dimethyl-propylene-(1,3), 2,3-butylene, 1,5-pentanylene, 1,4-butylene, 1,3-butylene, 1,2-butylene, and 1,6-hexylene or 1,2-cyclohexylene.

3. A compound of formula (III):

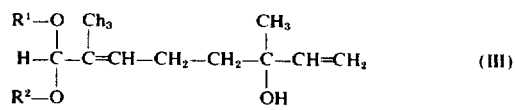

in which $R^1$ and $R^2$ together are alkylene of two to six carbon atoms, cycloalkylene of five or six carbon atoms in the ring or o-phenylene.

4. 2,6,10-trimethyldodeca-2,6,11-trien-10-ol-1-al-butylen-(1,3)-acetal.

* * * * *

UNITED STATES PATENT AND TRADEMARK OFFICE
CERTIFICATE OF CORRECTION

PATENT NO. : 3,896,150
DATED : July 22, 1975
INVENTOR(S) : HOFFMAN

It is certified that error appears in the above-identified patent and that said Letters Patent are hereby corrected as shown below:

In Column 10, the formula for Claim 3, delete

" 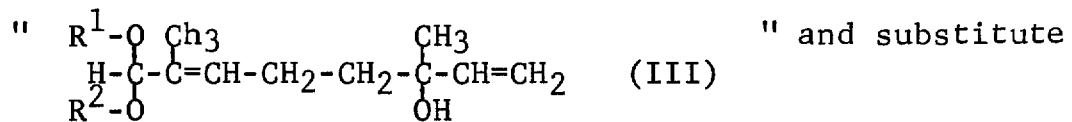  " and substitute

-- 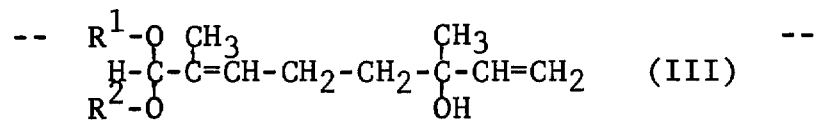 --

Signed and Sealed this

Twenty-first Day of September 1976

[SEAL]

Attest:

RUTH C. MASON
*Attesting Officer*

C. MARSHALL DANN
*Commissioner of Patents and Trademarks*